United States Patent
Smaini et al.

(10) Patent No.: US 9,893,749 B2
(45) Date of Patent: Feb. 13, 2018

(54) RECEIVER ARCHITECTURE WITH ANALOG COMPLEX FILTER FOR OFDMA RECEPTION

(71) Applicant: Apple Inc., Cupertino, CA (US)

(72) Inventors: Lydi Smaini, San Jose, CA (US); Tarik Tabet, Los Gatos, CA (US); Konstantinos Sarrigeorgidis, Sunnyvale, CA (US); Syed Aon Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 55 days.

(21) Appl. No.: 14/996,331

(22) Filed: Jan. 15, 2016

(65) Prior Publication Data

US 2016/0218758 A1    Jul. 28, 2016

Related U.S. Application Data

(60) Provisional application No. 62/108,017, filed on Jan. 26, 2015.

(51) Int. Cl.
*H04B 1/10* (2006.01)
*H04L 5/00* (2006.01)

(52) U.S. Cl.
CPC ........... *H04B 1/1018* (2013.01); *H04L 5/005* (2013.01); *H04L 5/0053* (2013.01)

(58) Field of Classification Search
CPC ...... H04B 1/1018; H04L 5/005; H04L 5/0053
USPC ......................................................... 375/267
See application file for complete search history.

(56) References Cited

U.S. PATENT DOCUMENTS

| | | | | |
|---|---|---|---|---|
| 7,024,172 B1 * | 4/2006 | Murphy | ............... | H04B 1/30 455/313 |
| 2005/0003853 A1 * | 1/2005 | Burgt | ............... | H03D 7/166 455/552.1 |
| 2010/0110307 A1 * | 5/2010 | Leme | ............... | H03D 7/166 348/731 |
| 2011/0293046 A1 | 12/2011 | Senoue et al. | | |
| 2011/0299639 A1 | 12/2011 | Maleysson et al. | | |
| 2013/0128995 A1 | 5/2013 | Mittelsteadt et al. | | |
| 2016/0142119 A1 * | 5/2016 | van Houtum | ............... | H04B 1/1036 375/260 |

* cited by examiner

*Primary Examiner* — Michael Neff
(74) *Attorney, Agent, or Firm* — Meyertons Hood Kivlin Kowert & Goetzel, P.C.; Jeffrey C. Hood; Matthew C. Washburn

(57) ABSTRACT

Methods and devices are provided for processing a received communication signal by a UE using an analog complex filter and using a single analog-to-digital converter (ADC). A control channel of the communication signal may be decoded to determine the frequency range in which a payload channel is located. The UE may then demodulate only the frequency range containing the payload channel. A complex representation of the received payload channel may be provided to the analog complex filter, with the payload channel shifted to a non-zero frequency IF. The analog complex filter may attenuate any portion of the complex representation that falls near −IF. The UE may then convert only one component path of the filtered complex representation to a digital signal. A complex representation of the digital signal may then be generated, with the payload channel shifted to DC.

20 Claims, 9 Drawing Sheets

RECEIVER ARCHITECTURE WITH ANALOG COMPLEX FILTER FOR OFDMA RECEPTION

PRIORITY INFORMATION

This application claims priority to U.S. provisional patent application Ser. No. 62/108,017, entitled "Receiver Architecture with Analog Complex Filter for OFDMA Reception," by Lydi Smaini, et al., filed Jan. 26, 2015, which is hereby incorporated by reference in its entirety as though fully and completely set forth herein.

TECHNICAL FIELD

The present application relates to wireless devices, and more particularly to a low-power cellular communication architecture.

DESCRIPTION OF THE RELATED ART

Wireless communication systems are rapidly growing in usage. Further, wireless communication technology has evolved from voice-only communications to also include the transmission of data, such as Internet and multimedia content. Wireless communication devices are most often portable, battery-powered devices. Therefore, improvements are desired in power consumption during wireless communication.

LTE is a 3GPP standard targeting high data rates. This is achieved through complex PHY/RF (Physical Layer/Radio Frequency) architectures to support multiple-input-multiple-output (MIMO), collision avoidance (CA), high order modulation schemes, etc. These data rates and applications require high power consumption and impact the battery life of the user equipment (UE).

In LTE, the Physical Downlink Control Channel (PD-CCH) carries Downlink Control Information (DCI), which includes resource assignments and other control information for a UE or group of UEs. In Radio Resource Control (RRC)-Connected mode a UE is required to decode the PDCCH in every subframe to see if there is a grant scheduled for it.

For example, an eNB can allocate resources in a Semi-Persistent Scheduling (SPS) fashion. Resources scheduled in this fashion are available periodically, without requiring additional signaling. This is particularly useful for applications such as voice communication. However, within the current 3GPP standards, the UE is still required to decode the PDCCH on every subframe. This is because the eNB is allowed to change the SPS grant. Additionally, the eNB could send a different grant for a different application.

Moreover, in the 3GPP standards, the Physical Downlink Shared Channel (PDSCH) can occupy 1 to 50 Radio Bearers (RBs). The number of RBs in the downlink (DL) allocation depends on the eNB scheduler. This is in contrast to the PDCCH, which will occupy the whole channel bandwidth.

Thus, the existing embodiments use unnecessary power in decoding unnecessary portions of the PDCCH and/or PDSCH. Improvements in the field are desired that can improve power efficiency.

SUMMARY

Embodiments described herein relate to apparatuses and associated methods for processing a received communication signal by a UE using an analog complex filter and using a single analog-to-digital converter (ADC).

An apparatus is disclosed, including one or more memory processors and a memory storing instructions executable by the one or more processors. The instructions, when executed by the one or more processors, may cause the apparatus to generate in-phase and quadrature component representations of a received communication signal, wherein the received communication signal includes a frequency range of interest, wherein the generated in-phase and quadrature component representations are frequency-shifted relative to the communication signal such that the frequency-shifted frequency range of interest has a center frequency IF and does not include 0 Hz. The instructions may further cause the apparatus to filter the in-phase and quadrature component representations of the communication signal using an analog complex filter; generate a digital signal representing only one of the in-phase and quadrature components of the communication signal; and generate in-phase and quadrature component representations of the digital signal.

In some embodiments of the disclosed apparatus, the frequency range of interest may have a bandwidth $BW_{RBs}$, wherein the analog complex filter is configured such that the frequency band of interest is not significantly attenuated, but a region centered at $-IF$ and having a bandwidth of $BW_{RBs}$ is significantly attenuated.

In some embodiments, the apparatus may further include a local oscillator operatively coupled to the one or more processors for use in the frequency shifting. The instructions, when executed, may further cause the apparatus to: determine a bandwidth $BW_{RBs}$ of the frequency range of interest; determine a center frequency $F_{RBs}$ of the frequency range of interest; select IF such that $|IF|>BW_{RBs}/2$; and configure the local oscillator to operate at a frequency of $F_{RBs}-IF$.

In some embodiments, the frequency range of interest may have a bandwidth that is less than the bandwidth of a received communication channel through which the received communication signal is transmitted.

In some embodiments, the frequency range of interest may include a control channel. For example, the control channel may be a Physical Downlink Control Channel (PDCCH).

In some embodiments, the frequency range of interest may include a payload channel. For example, the payload channel may be a Physical Downlink Shared Channel (PD-CCH).

In some embodiments, the in-phase and quadrature component representations of the digital signal may be such that the frequency-shifted frequency range of interest has a center frequency of 0 Hz. The instructions, when executed, may further cause the apparatus to filter the in-phase and quadrature component representations of the digital signal using a low-pass filter.

A method is also disclosed, having steps similar to those defined by the instructions stored in the memory of the apparatus described above.

BRIEF DESCRIPTION OF THE DRAWINGS

A better understanding of the disclosure can be obtained when the following detailed description of the embodiments is considered in conjunction with the following drawings.

Figure 1A:
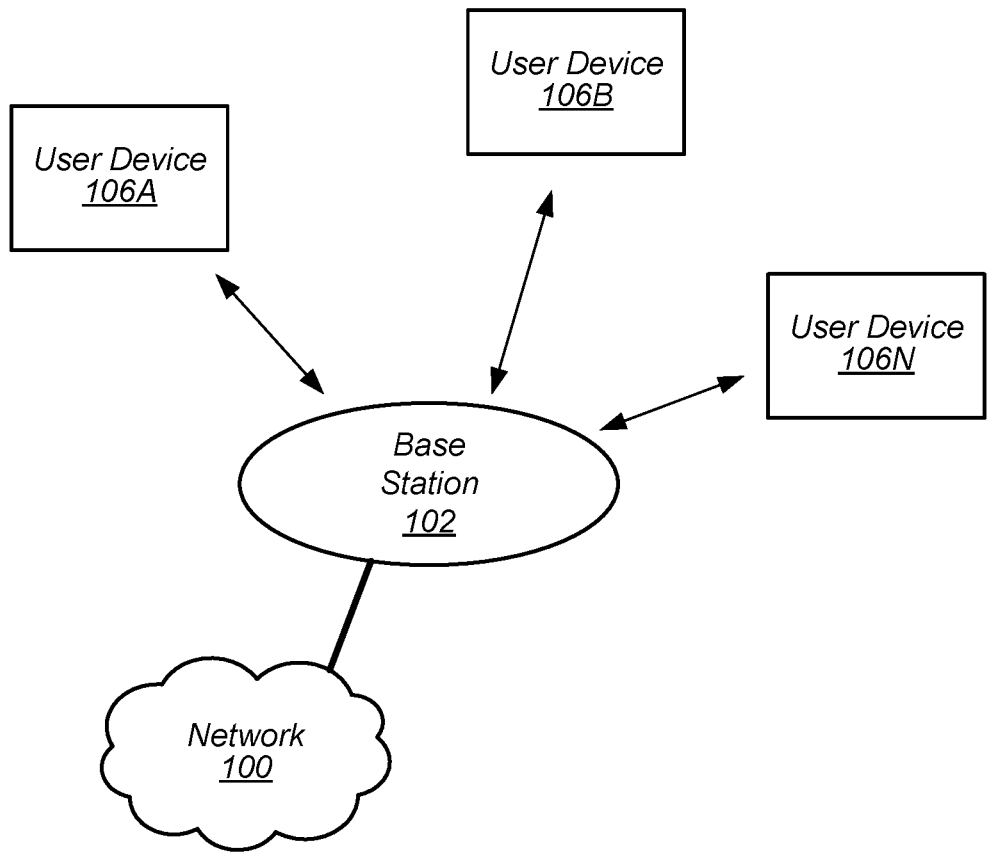
FIG. 1A illustrates an exemplary (and simplified) wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Incorporation by Reference

U.S. patent application Ser. No. 14/500,917, filed on Sep. 29, 2014, and titled "Control Signaling Optimization for LTE Communications", is hereby incorporated by reference in its entirety as though fully and completely set forth herein.

Acronyms

The following acronyms are used in the present Provisional Patent Application:

ASIC: Application Specific Integrated Circuit
BS: Base Station
CDMA: Code Division Multiple Access
CDRX: Connected Discontinuous Reception
DL: Downlink
FPGA: Field Programmable Gate Array
GSM: Global System for Mobile Communications
LTE: Long-Term Evolution
MMU: Memory Management Unit
PDCCH: Physical Downlink Control Channel
PDSCH: Physical Downlink Shared Channel
RAT: Radio Access Technology
RFIC: Radio Frequency Integrated Circuit
ROM: Read-Only Memory
RRC: Radio Resource Control
Rx: Reception
SOC: System on a Chip
Tx: Transmission
UE: User Equipment
UL: Uplink
UMTS: Universal Mobile Telecommunication System Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system that connects to the first computer system over a network, such as the Internet. In the latter instance, the second computer system may provide program instructions to the first computer system for execution. The term "memory medium" may include two or more memory mediums, which may reside in different locations, e.g., in different computer systems that are connected over a network. The memory medium may store program instructions (e.g., embodied as computer programs) that may be executed by one or more processors.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices that are mobile or portable and which performs wireless communications. Examples of UE devices include mobile telephones or smart phones (e.g., iPhone™, Android™-based phones), tablet computers (e.g., iPad™, Samsung Galaxy™, etc.), portable gaming devices (e.g., Nintendo DS™, PlayStation Portable™, Gameboy Advance™, iPhone™), laptops, PDAs, portable Internet devices, music players, data storage devices, or other handheld devices, as well as wearable devices such as smart watches, smart glasses, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1B:
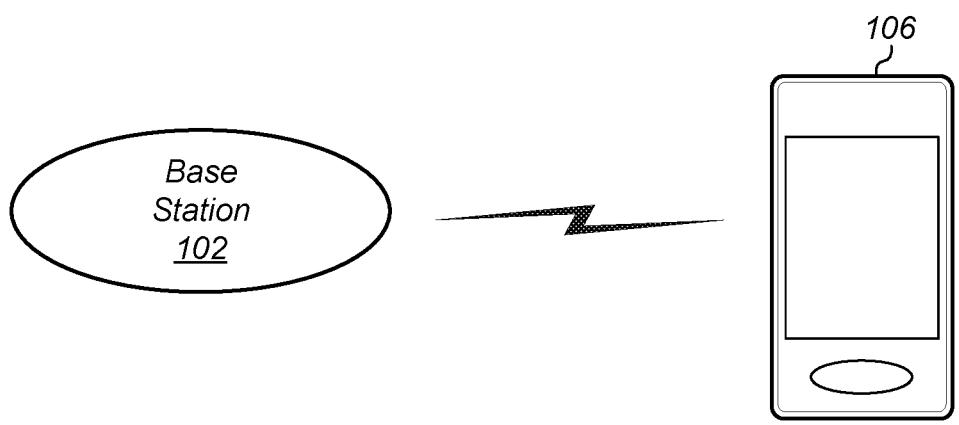
FIG. 1B illustrates a base station in communication with a user equipment (UE) device, according to some embodiments.

FIGS. 1A and 1B—Communication System

FIG. 1A illustrates an exemplary (and simplified) wireless communication system. It is noted that the system of FIG. 1A is merely one example of a possible system, and other embodiments may be implemented in any of various systems, as desired.

As shown, the exemplary wireless communication system includes a base station 102 which communicates over a transmission medium with one or more User Equipment (UE) (or "UE devices") 106A through 106N.

The base station 102 may be a base transceiver station (BTS) or cell site (such as an eNB), and may include hardware that enables wireless communication with the UEs 106A through 106N. The base station 102 may also be equipped to communicate with a network 100. Thus, the base station 102 may facilitate communication between the UEs 106 and/or between the UEs 106 and the network 100. The communication area (or coverage area) of the base station may be referred to as a "cell." The base station 102 and the UEs 106 may be configured to communicate over the transmission medium using any of various wireless communication technologies such as LTE (Long Term Evolution), GSM (Global System for Mobile communications), CDMA (Code Division Multiple Access), WLL (Wireless Local Loop), WAN (wireless area network), WiFi, WiMAX, etc.

FIG. 1B illustrates UE 106 (e.g., one of the devices 106A through 106N) in communication with the base station 102. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the embodiments described herein by executing such stored instructions. In some embodiments, the UE 106 may include one or more processing elements such as ASIC (Application Specific Integrated Circuits) that are configured to perform any of the method embodiments described herein, or any portion of any of the method embodiments described herein.

Figure 2:
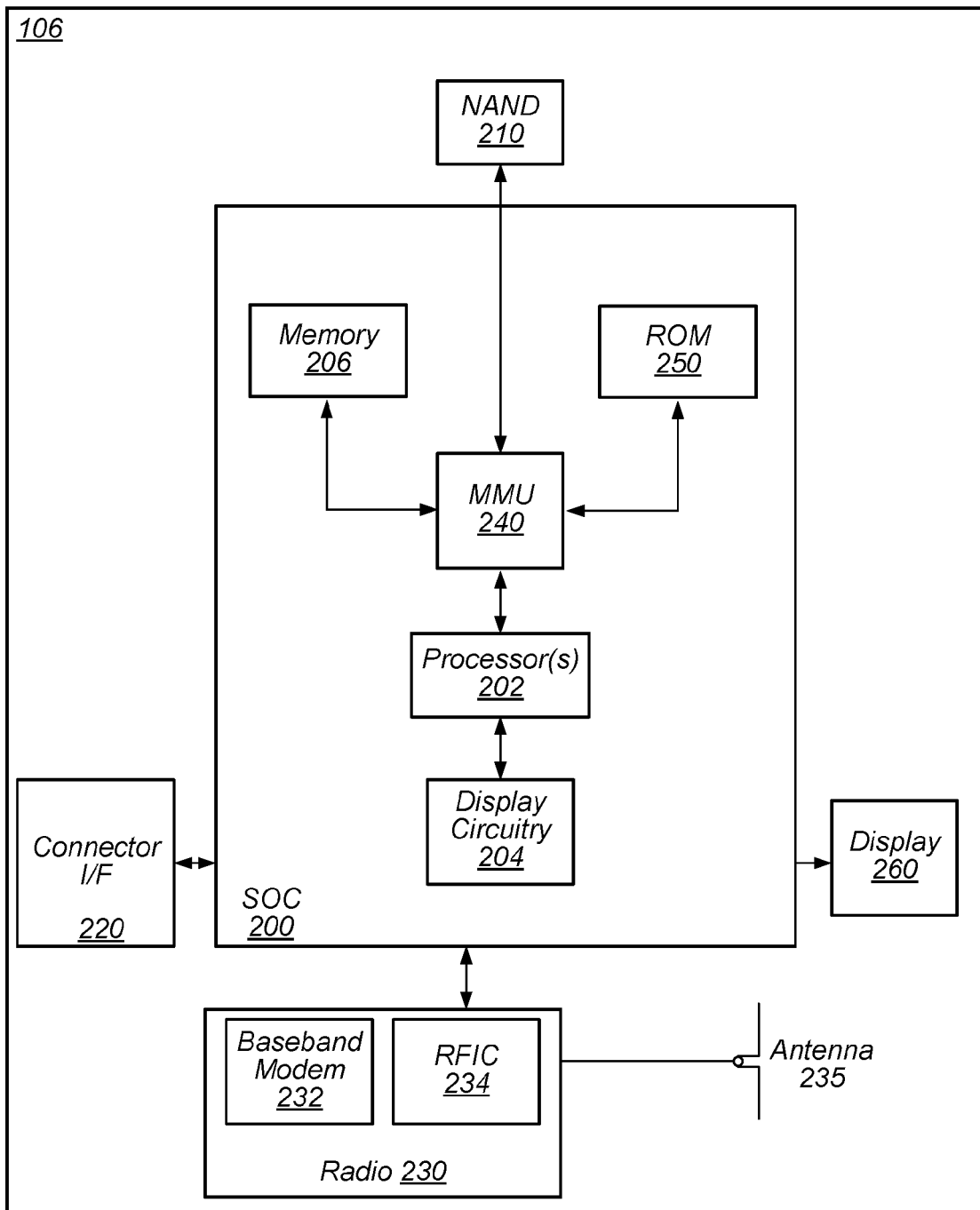
FIG. 2 illustrates an exemplary block diagram of a UE, according to some embodiments.

FIG. 2—Exemplary Block Diagram of a UE

FIG. 2 illustrates an exemplary block diagram of a UE 106. As shown, the UE 106 may include a system on chip (SOC) 200, which may include portions for various purposes. For example, as shown, the SOC 200 may include processor(s) 202, which may execute program instructions for the UE 106, and display circuitry 204, which may perform graphics processing and provide display signals to the display 260. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, radio transceiver 230, connector I/F 220, and/or display 260. The MMU 240 may be configured to perform memory protection and page table translation or set up. In some embodiments, the MMU 240 may be included as a portion of the processor(s) 202.

As also shown, the SOC 200 may be coupled to various other circuits of the UE 106. For example, the UE 106 may include various types of memory (e.g., including NAND flash 210), a connector interface 220 (e.g., for coupling to the computer system), the display 260, and wireless communication circuitry such as radio transceiver 230 (e.g., for LTE, GSM, Bluetooth, WiFi, etc.) which may use antenna 235 to perform the wireless communication.

The radio transceiver 230 may include one or more radio circuits configured to communicate via one or more radio access technologies (RATs), such as LTE, GSM, CDMA, WLL, WAN, WiFi, WiMAX, Bluetooth, etc. For a given RAT, the radio transceiver 230 may include a digital baseband modem 232 and a radio frequency integrated circuit (RFIC) 234. For example, the RFIC 234 may be connected to the antenna 235 and to the digital baseband modem 232, and may be configured to convert between RF signals transmitted or received by the antenna 235 and baseband signals processed by the digital baseband modem 232. In some embodiments, the digital baseband modem 232 may alternatively be included in the SOC 200 or elsewhere in the UE 106. For example, advanced wireless communication SOC used in UEs may embed memory, processors, digital signal processing, and radio(s) integrated into a single chip (e.g., in CMOS technology) for low power consumption and platform optimization. Consequently SOC 200 may integrate one or more radios (e.g., combination chips with capability of supporting one or more of WiFi, Bluetooth, GPS, FM, etc.).

The digital baseband modem 232 or other portions of the UE 106 may be configured to implement part or all of the methods described herein, e.g., by executing program instructions stored on a memory medium (e.g., a non-transitory computer-readable memory medium). Alternatively, the digital baseband modem 232 may be configured as a programmable hardware element, such as an FPGA (Field Programmable Gate Array), or as an ASIC (Application Specific Integrated Circuit), or a combination thereof.

Figure 3:
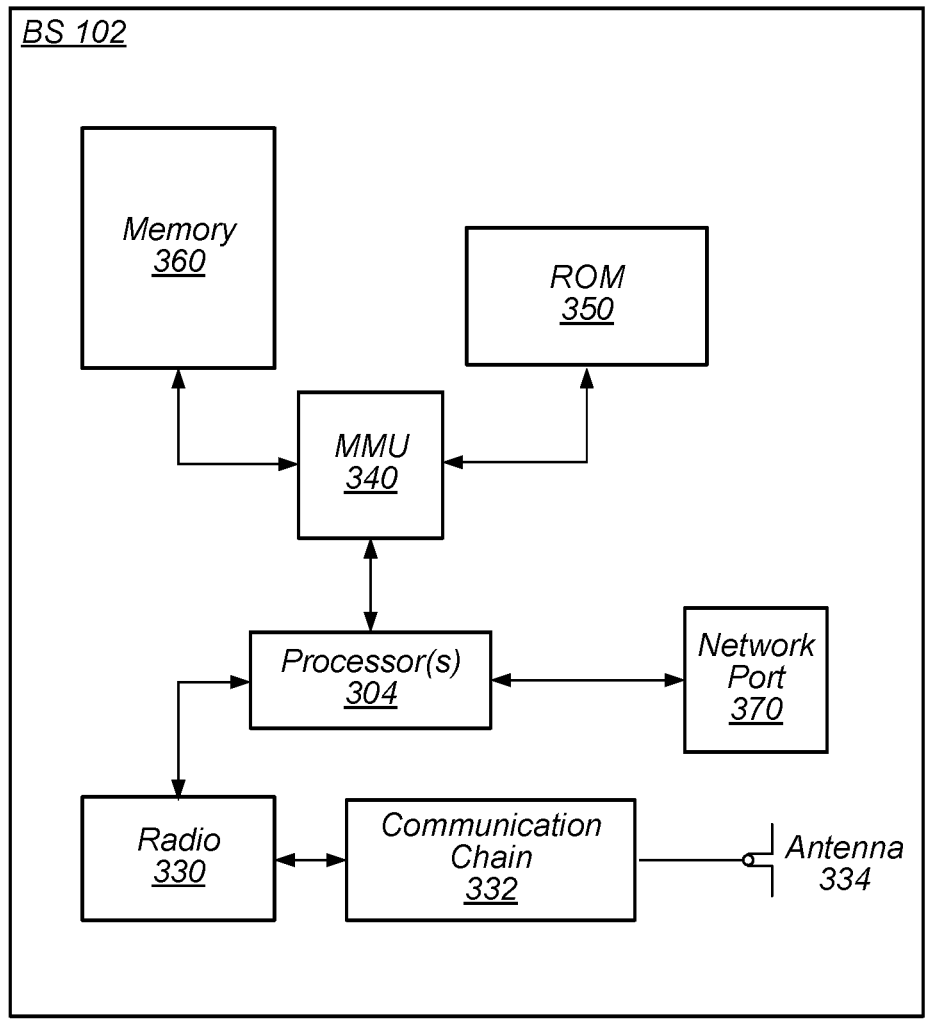
FIG. 3 illustrates an exemplary block diagram of a base station, according to some embodiments.

FIG. 3—Base Station

FIG. 3 illustrates an exemplary block diagram of a base station 102. It is noted that the base station of FIG. 3 is merely one example of a possible base station. As shown, the base station 102 may include processor(s) 304, which may execute program instructions for the base station 102. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The base station 102 may include at least one network port 370. The network port 370 may be configured to couple to a telephone network and provide a plurality of devices, such as UE devices 106, access to the telephone network as described above.

The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices 106 serviced by the cellular service provider).

The base station 102 may include at least one antenna 334. The at least one antenna 334 may be configured to operate as a wireless transceiver and may be further configured to communicate with UE devices 106 via radio 330. The antenna 334 may communicate with the radio 330 via communication chain 332. Communication chain 332 may be a receive chain, a transmit chain, or both. The radio 330 may be configured to communicate via various RATs, including, but not limited to, LTE, GSM, TDS, WCDMA, CDMA2000, etc.

The processor(s) 304 of the base station 102 may be configured to implement part or all of the methods described herein, e.g., by executing program instructions stored on a memory medium (e.g., a non-transitory computer-readable memory medium). Alternatively, the processor 304 may be configured as a programmable hardware element, such as an FPGA (Field Programmable Gate Array), or as an ASIC (Application Specific Integrated Circuit), or a combination thereof.

Figure 4:
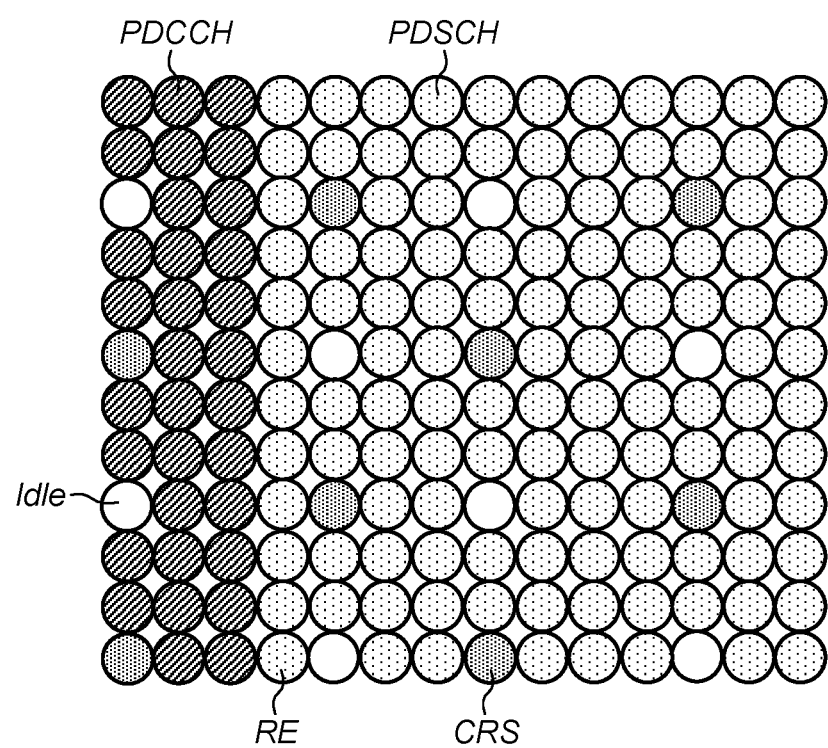
FIG. 4 illustrates an example of a Physical Resource Block (PRB) of a downlink subframe, according to some embodiments.

FIG. 4—PDSCH/PDCCH Scheduling

Under the current 3GPP standards, a communication signal may be transmitted through a communication channel having a channel bandwidth. The PDCCH occupies the full channel bandwidth across the first OFDM symbols of a subframe. The number of OFDM symbols occupied by the PDCCH is signaled through the Physical Control Format Indicator Channel (PCFICH) and varies from 1 to 4.

Further, under the current 3GPP standards, the PDSCH occupies the remaining OFDM symbols of a subframe. The PDSCH may be narrowband (i.e., less that the full channel bandwidth), and the number of RBs it occupies is indicated by the PDCCH.

FIG. 4 illustrates an example of a Physical Resource Block (PRB) of a DL subframe according to the current 3GPP standards. In the example shown, the PDCCH occupies the first three OFDM symbols of the subframe. The PDSCH occupies the remainder of the subframe. Idle resource elements (REs) and REs containing Cell-specific Reference Signals (CRSs) are shown interspersed within both the PDCCH and the PDSCH. In this example, the PDSCH occupies at least the 12 RBs of the illustrated PRB. The PDSCH may also occupy additional RBs within the subframe, as specified by the PDCCH.

Power efficiency may be improved my modifying the above protocol. For example, where a Semi-Persistent Scheduling (SPS) grant or similar recurring resource allocation is made, decoding of the PDCCH by the UE may be disabled, e.g., for a predetermined period of time. This embodiment may be particularly useful for devices supporting applications that are low data rate and periodic. For example, this embodiment may be particularly useful for voice communication. Aspects of this embodiment are discussed more fully in U.S. patent application Ser. No. 14/500,917, which was previously incorporated by reference.

Alternatively, or additionally, the PDCCH processing requirements of a UE may be changed such that the PDCCH decoding is finished before the end of the first slot (i.e., before the end of the first half of the subframe). In such embodiments, the PDSCH may not occupy the first slot; i.e., the PDSCH may begin in the second slot. Alternatively, portions of the PDSCH that are assigned to the UE may not occupy the first slot, while other portions of the PDSCH may occupy portions of the first slot and/or portions of the second slot. In this manner, the resource allocation of the PDSCH (or the relevant portion of the PDSCH), which is specified in the PDCCH, may be known before the UE begins decoding the PDSCH. The UE may therefore decode only the portions of the PDSCH that are assigned to the UE, e.g., by using one of the complex filter architectures discussed below.

Figure 5:
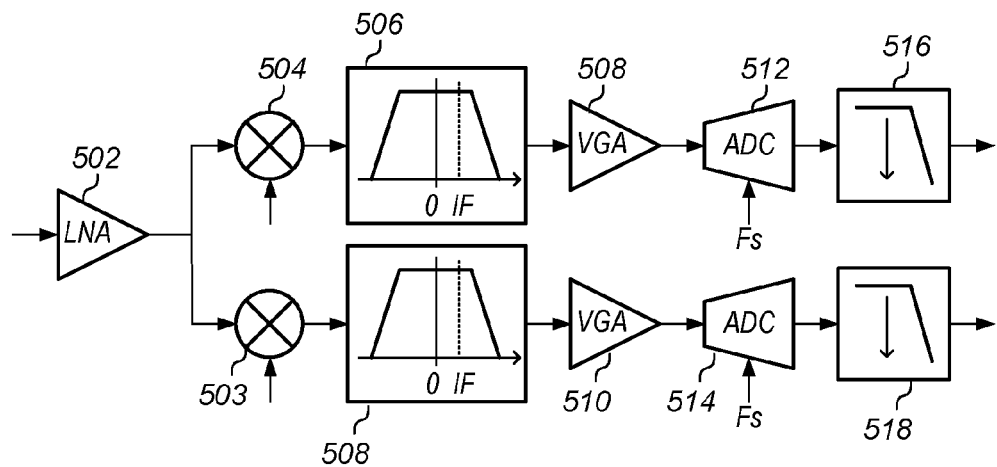
FIG. 5 illustrates an exemplary block diagram of an architecture for processing a received communication signal, according to some embodiments.

FIGS. 5-6—Zero IF and Low IF Architectures

FIG. 5 illustrates an exemplary block diagram of an architecture for processing a received communication signal according to the prior art. As shown, the received signal may be amplified by a low noise amplifier (LNA) 502, and then split into two signal paths (In Phase [I] and Quadrature [Q] paths) to be processed as a complex signal. In each path, the received signal may be frequency-shifted, e.g., by mixing with a signal from a local oscillator (LO) using mixers 503 and 504. Each frequency-shifted signal may be filtered with a respective low-pass filter, such as low-pass filters 506 and 508. Each filtered signal may be further amplified, e.g., by a respective voltage gain amplifier (VGA), such as VGAs 510 and 512, and then converted into a digital signal by an analog-to-digital converter (ADC), such as ADCs 512 and 514, at a sampling frequency $F_s$. Each converted signal may then be downsampled, e.g., by downsamplers 516 and 518, according to a desired sampling rate.

Figure 6A:
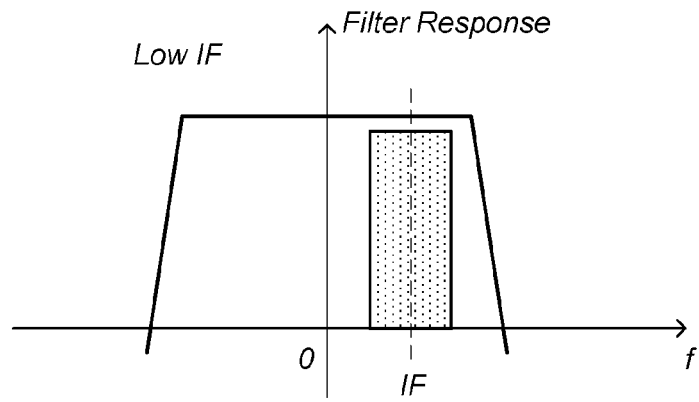
FIGS. 6A and 6B illustrate power spectrum density (PSD) and filter response diagrams for low IF and zero IF implementations of the architecture of FIG. 5.

This architecture may utilize either a low intermediate frequency (IF) approach or a zero IF approach. The low IF approach is illustrated in FIG. 6A. In this approach, the LO is configured to frequency-shift the received signal such that a frequency of interest (e.g., a center frequency of a frequency range of interest) is shifted to a frequency "IF", which is non-zero. IF may be selected such that the frequency range of interest falls entirely within the bandwidth of the low-pass filter, without causing the frequency range of interest to intersect DC.

Figure 6B:
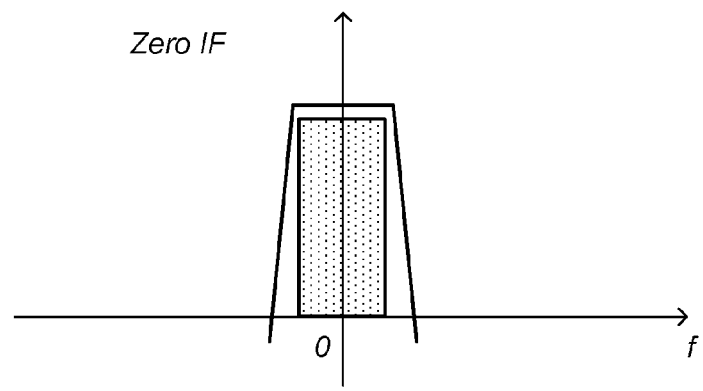

The zero IF approach is illustrated in FIG. 6B. In this approach, the LO is configured to frequency-shift the received signal such that a frequency of interest is shifted to DC. The low-pass filter may be selected such that the frequency range of interest falls entirely within the filter's bandwidth.

The low IF architecture is less sensitive to DC offset and flicker noise (which is a particular concern in sub-micron CMOS technology, which is commonly used to make ICs), but requires a wideband low-pass filter and very good IQ matching to minimize generation of an alias of the image located at −IF (distance of 2×IF from the desired signal). Both approaches require two ADCs to quantize the complex signal—one for each path.

Figure 7:
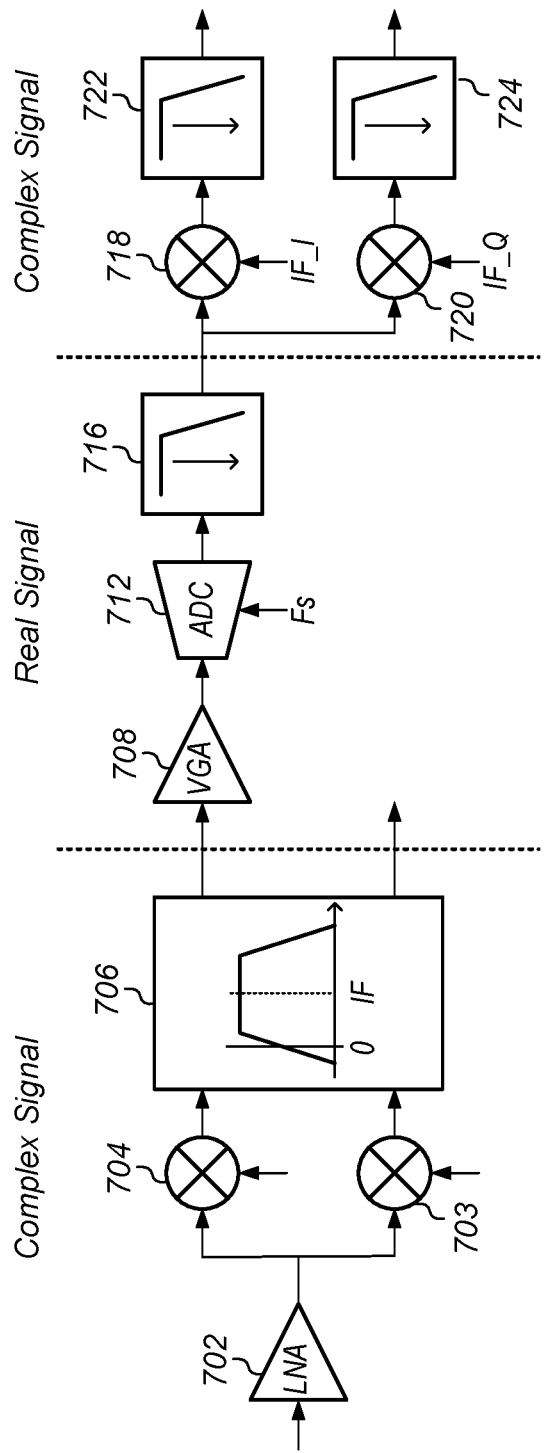
FIG. 7 illustrates an exemplary block diagram of an architecture for processing a received communication signal, according to some embodiments.

FIGS. 7-8—Low IF Architecture with an Analog Complex Filter

FIG. 7 illustrates an exemplary block diagram of an architecture for processing a received communication signal according to some embodiments utilizing only one ADC. Such an embodiment may thus allow power savings over the prior art. Such an embodiment may be included, for example, within the digital baseband modem 232 of FIG. 2.

FIGS. 8A-8D illustrate power spectrum density (PSD) graphs of an example of a received communication signal at various points of processing within the architecture of FIG. 7.

Figure 8A:
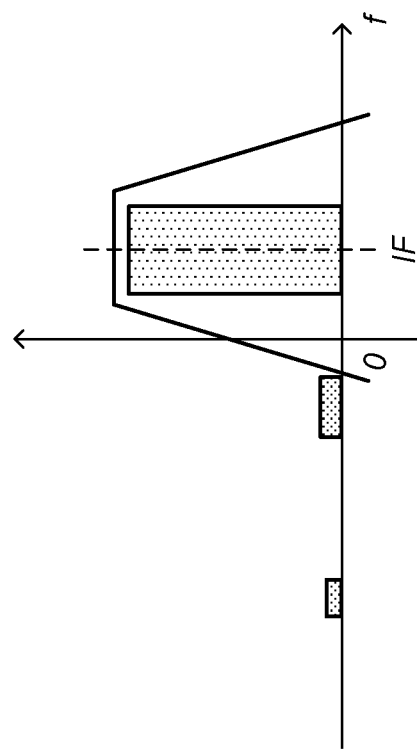
FIGS. 8A-8D illustrate PSD and filter response diagrams of an example of a received communication signal at various points of processing within the architecture of FIG. 7.

FIG. 8A illustrates the communication signal as initially received, having a channel frequency $F_c$. The received communication signal may include RBs allocated to the UE. For example, as shown, the received communication signal includes a PDSCH allocated to the UE, having a center frequency $F_{RBs}$, which may not coincide with $F_c$. The received signal may further include additional RBs allocated to other users.

As shown in FIG. 7, the received signal may be amplified (e.g., by a LNA, such as the LNA 702), and then split into two signal paths (I and Q paths). In each path, the received signal may be frequency-shifted, e.g., by mixing with a signal from a local oscillator (LO) using mixers 703 and 704, to generate the complex components of the received signal at a desired frequency for filtering. Both frequency-shifted signals may be provided to a single analog complex filter 706.

Figure 8B:
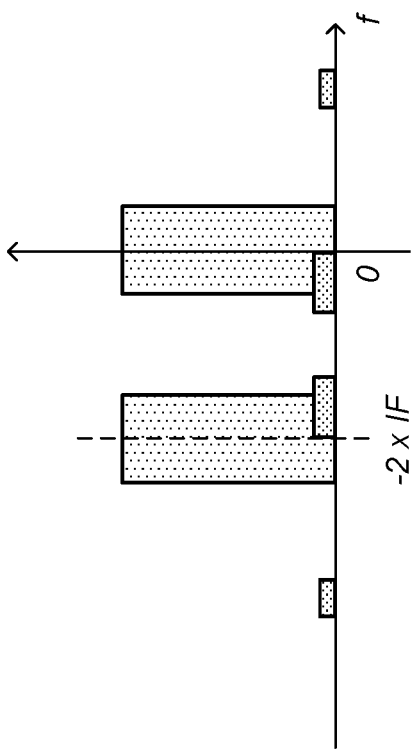

FIG. 8B illustrates an exemplary frequency response and output of the analog complex filter. As shown, the signal has been shifted such that the center frequency of the PDSCH allocated to the UE is located at a non-zero frequency IF. For example, the LO may be configured to operate at a frequency of ($F_{RBs}$–IF). IF may be selected based on the bandwidth of the frequency range of interest (e.g., the number of RBs allocated to the PDSCH) and/or the characteristics of the analog complex filter, such that the frequency range of interest (e.g., the PDSCH) does not intersect DC. IF may be selected to be either positive or negative. As shown in FIG. 8B, the PDSCH has not been attenuated, but the RBs allocated to other users have been significantly attenuated by the analog complex filter.

Figure 8C:
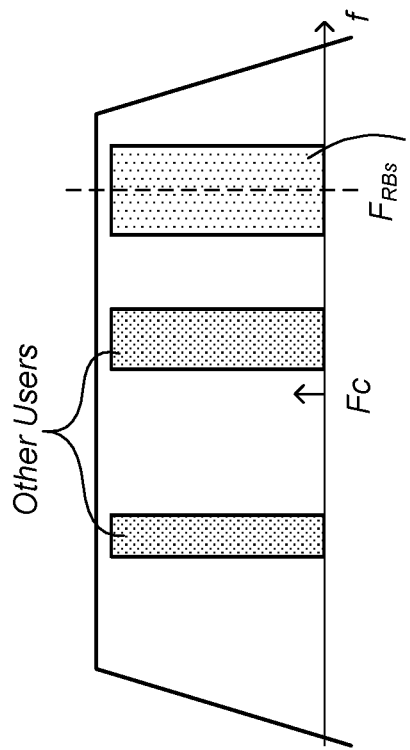

After the complex signal has been filtered, one component path of the complex signal output by the filter (i.e., either the I path or the Q path) may be discarded. The remaining component path may then be further processed as a real signal. In the example architecture shown in FIG. 7, the Q path is discarded. However, in another embodiment, the I path may be discarded. FIG. 8C illustrates the PSD of the real signal present on the remaining I path as output by the analog complex filter in the present example. Because the I component is a real component of the complex signal, the I component PSD is symmetrical around DC. Thus, portions of the complex signal that appeared near –IF may be aliased within the frequency range of interest near IF. Therefore, the analog complex filter may be specified such that the frequency range of interest is not significantly attenuated, while the portion of the signal located at the negative of the frequency range of interest (i.e., near –IF) is significantly attenuated, so as to increase the ratio of the desired signal to the aliases appearing within the frequency range of interest of the real component of the signal. For example, the analog complex filter may be specified to be centered at or near IF, with a bandwidth approximately equal to the frequency range of interest (e.g. approximately equal to the bandwidth of the PDSCH). Similarly, portions of the complex signal that appeared at IF in the frequency range of interest will be aliased at –IF.

As shown in FIG. 8C, the PDSCH is centered at IF, and is aliased at –IF. The attenuated RBs assigned to other users, which were located in the negative frequency range of FIG. 8B are aliased in the positive frequency range of FIG. 8C.

Figure 8D:
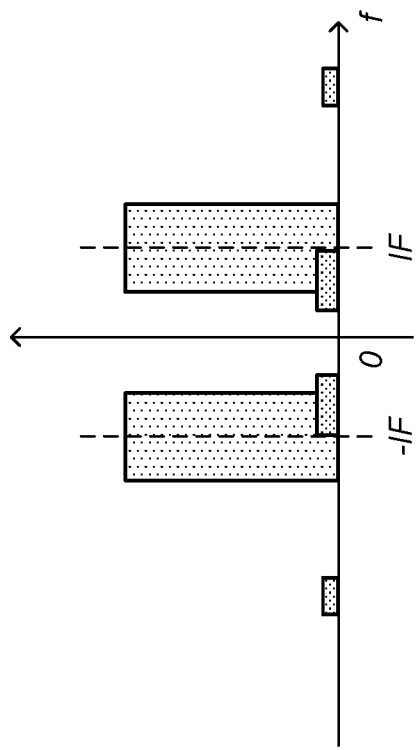

The remaining component path output by the analog complex filter may amplified (e.g., by a VGA 708), and converted to a digital signal by an ADC 712. The converted signal may then be downsampled, e.g., by a downsampler 716, according to a desired sampling rate. The converted signal may then be again split into two signal paths (I and Q paths). In each path, the received signal may be frequency-shifted, e.g., by mixing with a signal from a Numerical Control Oscillator (NCO) using mixers 718 and 720, to generate the complex components of the converted signal, with the frequency range of interest shifted to DC. FIG. 8D illustrates the complex signal (i.e., I+j×Q) after each path has been frequency-shifted with the NCO. As shown, the PDSCH is centered at DC, and the aliased version of the PDSCH has been shifted to –2×IF.

Following the frequency-shifting, each signal path may again be downsampled, e.g., using downsamplers 722 and 724, according to a desired sampling rate. Each signal path may be further filtered to attenuate undesired portions of the signal, such as the aliased version of the frequency range of interest, which is now located at –2×IF. Because the frequency range of interest has been shifted to DC, this filtering may use a simple low-pass filter (not shown).

Figure 9A:
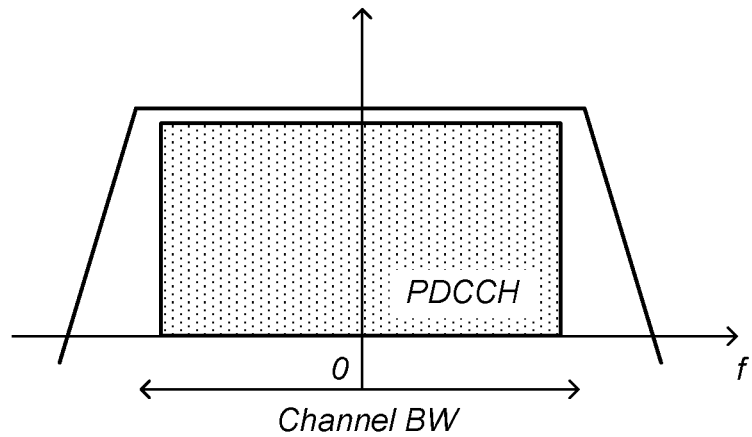
FIGS. 9A and 9B illustrate PSD and filter response diagrams of an example of a received PDCCH signal and a received PDSCH signal, according to some embodiments.
Figure 9B:
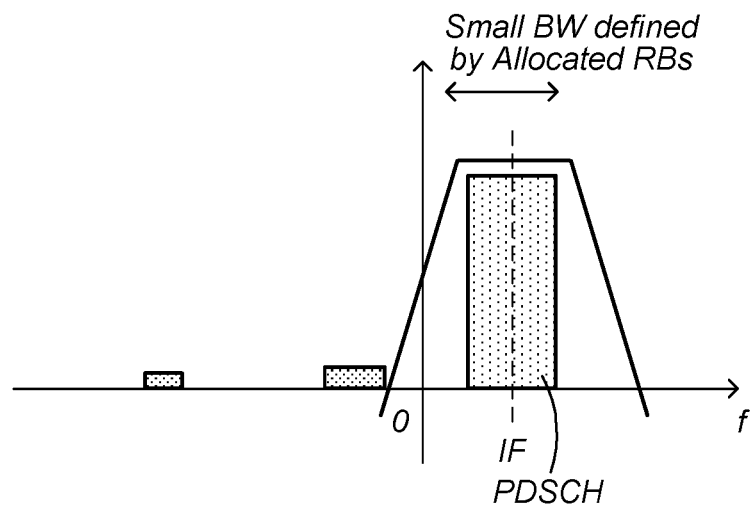

FIG. 9A-B—Zero IF and Low IF Combination Architecture

In some embodiments, a baseband modem, such as the digital baseband modem 232 of a UE, such as the UE 106, may be configured to use a zero IF architecture as shown in FIG. 5 to process a PDCCH of a communication signal, which is wideband (i.e., the full bandwidth of the communication signal). The digital baseband modem 232 may be further configured to use a low IF architecture as shown in FIG. 7 to process a PDSCH, which may have a narrower bandwidth (i.e., the assigned number of RBs) than the channel bandwidth.

In such embodiments, while demodulating the PDCCH, the local oscillator may be configured to operate at a frequency of $F_c$ of the channel bandwidth, such that the I and Q paths are frequency-shifted to a center frequency of DC. Because the frequency range of interest of the frequency-shifted component signals encompasses DC, both component paths may be preserved. Each component path may be filtered using a respective low pass filter. FIG. 9A illustrates an exemplary frequency response and output of one of the low pass filters.

Once the PDCCH has been demodulated, the UE 106 may decode the PDCCH and determine the PDSCH allocation. The UE 106 may then reconfigure the radio 234 and the digital baseband modem 232 to demodulate only a frequency range of interest of the remainder of the subframe; e.g., the RBs bearing the PDSCH allocated to the UE 106. The communication signal may be configured such that the PDSCH allocated to the UE 106 does not begin until a sufficient time has passed following the PDCCH to allow for the UE 106 to decode the PDCCH and reconfigure the radio 234 and the digital baseband modem 232 to demodulate the PDSCH.

While demodulating the PDSCH, the UE 106 (using the digital baseband modem 232 and/or other components) may determine a bandwidth $BW_{RBs}$ and a center frequency $F_{RBs}$ of the RBs bearing the PDSCH allocated to the UE 106. The UE 106 may then select IF such that, when the PDSCH is shifted to center at IF, it will not encompass DC. For example, IF may be selected as either a positive or negative value such that $|IF|>BW_{RBs}/2$. The selection of IF may be further based on other factors, such as the characteristics of the analog complex filter, location of other additional RBs allocated to other users, etc. The local oscillator may be reconfigured to operate at a frequency of $F_{RBs}-IF$, such that the component paths are frequency shifted to center the PDSCH at IF.

In the digital baseband modem 232, both component paths may be provided to the single analog complex filter. The UE 106 may configure the analog complex filter based, e.g., on the determined value of $BW_{RBs}$ and/or IF. For example, the UE 106 may configure the analog complex filter such that the PDSCH is not significantly attenuated, but that a region centered at −IF and having a bandwidth of $BW_{RBs}$ is significantly attenuated. FIG. 9B illustrates an exemplary frequency response and output of the analog complex filter.

As discussed with regard to FIG. 7, after the complex signal has been filtered, one component path of the complex signal output by the filter may be discarded, while the remaining component path may be converted to a digital signal.

The digitally converted signal may then be again split into two signal paths (I and Q paths). In each path, the received signal may be frequency-shifted to generate the complex components of the converted signal, with the frequency range of interest shifted to DC.

Following the frequency-shifting, each signal path may be further filtered to attenuate undesired portions of the signal, such as the aliased version of the frequency range of interest, which is now located at −2×IF. Because the frequency range of interest has been shifted to DC, this filtering may use a simple low-pass filter.

Figure 10A:
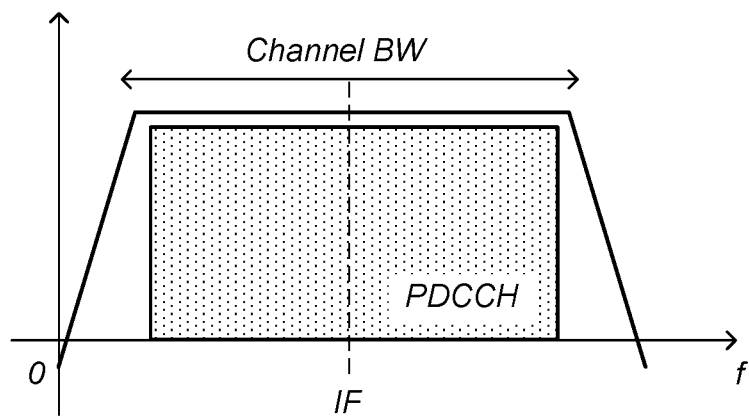
FIGS. 10A and 10B illustrate PSD and filter response diagrams of an example of a received PDCCH signal and a received PDSCH signal, according to some embodiments.
Figure 10B:
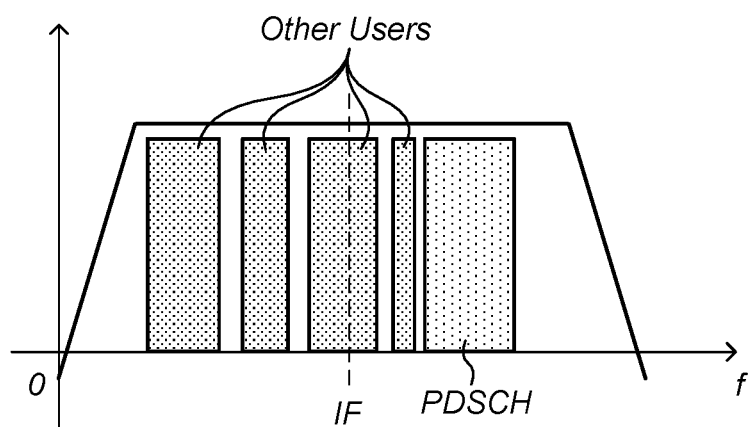

FIGS. 10A-B—Low IF Architecture

In some other embodiments, a baseband modem, such as the digital baseband modem 232 of a UE, such as the UE 106, may be configured to use a low IF architecture as shown in FIG. 7 to process both a PDCCH of a communication signal, which is wideband (i.e., the full bandwidth of the communication signal) and a PDSCH of the communication signal, which may have a narrower bandwidth (i.e., the assigned number of RBs).

In such embodiments, while demodulating the PDCCH, the UE 106 may determine a bandwidth $BW_C$ and a center frequency $F_C$ of the PDCCH. For example $BW_C$ may be the channel bandwidth, and $F_C$ may be the channel frequency. The UE 106 may then select IF such that, when the two component signals are shifted such that the PDCCH is centered at IF, the PDCCH will not encompass DC. For example, IF may be selected such that $|IF|>BW_C/2$. The UE 106 may configure the LO to operate at a frequency of $F_C-IF$, such that the communication signal is frequency shifted to center the PDCCH at IF.

In the digital baseband modem 232, both component paths may be provided to the single analog complex filter. The UE 106 may configure the analog complex filter based, e.g., on the determined value of $BW_C$ and/or IF. FIG. 10A illustrates an exemplary frequency response and output of the analog complex filter.

As discussed with regard to FIG. 7, after the complex signal has been filtered, one component path of the complex signal output by the filter may be discarded, while the remaining component path may be converted to a digital signal.

The digitally converted signal may then be again split into two signal paths (I and Q paths). In each path, the received signal may be frequency-shifted to generate the complex components of the converted signal, with the frequency range of interest shifted to DC.

Following the frequency-shifting, each signal path may be further filtered to attenuate undesired portions of the signal, such as the aliased version of the frequency range of interest, which is now located at −2×IF. Because the frequency range of interest has been shifted to DC, this filtering may use a simple low-pass filter.

Once the PDCCH has been demodulated, the UE 106 may decode the PDCCH and determine the PDSCH allocation. The UE 106 may then reconfigure the radio 234 and the digital baseband modem 232 to demodulate the PDSCH.

In some embodiments, the UE 106 may reconfigure the radio 234 and the digital baseband modem 232 to demodulate only the RBs bearing the PDSCH allocated to the UE 106. The communication signal may be configured such that the PDSCH allocated to the UE 106 does not begin until a sufficient time has passed following the PDCCH to allow for the UE 106 to decode the PDCCH and reconfigure the radio 234 and the digital baseband modem 232 to demodulate the PDSCH. The reconfigured digital baseband modem 232 may then demodulate the PDSCH in the manner described above with regard to FIG. 9B.

In alternative embodiments, the UE 106 may reconfigure the radio 234 and the digital baseband modem 232 to a lesser degree, to allow the baseband modem to be ready more quickly to demodulate the PDSCH. This may reduce the delay required between the end of the PDCCH and the start of the PDSCH.

In such alternative embodiments, while demodulating the PDSCH, the UE 106 (using the digital baseband modem 232 and/or other components) may utilize the same IF as was used during demodulation of the PDCCH. Thus, the UE 106 may demodulate the PDCCH without reconfiguring the LO to a different frequency. Where, as is typical, $BW_C$ is the full bandwidth of the communication signal, we are assured that $BW_C/2 \geq BW_{RBs}/2$. Because IF was selected such that Thus, $|IF|>BW_C/2$, we are thus assured that $|IF|>BW_{RBs}/2$.

In the digital baseband modem 232, both component paths may be provided to the single analog complex filter. In this second embodiment, the analog complex filter may also remain as it was configured for demodulation of the PDCCH. FIG. 10B illustrates an exemplary frequency response and output of the analog complex filter. As shown, the pass band of the analog complex filter may include the full bandwidth of the communication signal, and may thus not attenuate RBs allocated to other users.

As discussed with regard to FIG. 7, after the complex signal has been filtered, one component path of the complex signal output by the filter may be discarded, while the remaining component path may be converted to a digital signal.

The digitally converted signal may then be again split into two signal paths (I and Q paths). In each path, the received signal may be frequency-shifted to generate the complex components of the converted signal, with the frequency range of interest shifted to DC. In one embodiment, the frequency range of interest may include the entire region previously centered at IF, and having a bandwidth of $BW_C$. Following the frequency-shifting, each signal path may be further filtered to attenuate undesired portions of the signal, such as the aliased version of the frequency range of interest, which is now located at −2×IF, e.g., using a low-pass filter. In this case, the UE may decode the entire channel bandwidth, as in the prior art. However, power savings may still be achieved over the prior art, as the demodulation uses only a single ADC.

Alternatively, the frequency range of interest may constitute only the PDSCH. In this case, the signal may be frequency-shifted such that the PDSCH is centered at DC. Following the frequency-shifting, each signal path may be further filtered to attenuate undesired portions of the signal, such as the aliased version of the frequency range of interest, which is now located at −2×IF, e.g., using a low pass filter. This filtering may further attenuate RBs assigned to other users. Thus, in this embodiment, the UE may decode only the PDSCH assigned to the UE 106.

Example Embodiments

Some embodiments may include a method, performed by a user equipment (UE), of processing a received communication signal. The method may include processing a control channel included in the communication signal. The processing the control channel may include: selecting a frequency $IF_C$ such that $|IF_C|>BW_C/2$, wherein $BW_C$ is a bandwidth of the control channel; generating in-phase and quadrature component representations of the communication signal that are frequency-shifted such that the control channel is centered at $IF_C$; filtering the in-phase and quadrature component representations of the communication signal using an analog complex filter; generating a digital signal representing only one of the in-phase and quadrature components of the communication signal; generating in-phase and quadrature component representations of the digital signal; and decoding the control channel, wherein the decoded control channel identifies a payload channel in the communication signal that is allocated to the UE. The method may further include processing the identified payload channel.

In some embodiments of the preceding method, the processing the identified payload channel may include: selecting a frequency $IF_P$ such that $|IF_P|>BW_P/2$, wherein $BW_P$ is a bandwidth of the payload channel; generating in-phase and quadrature component representations of the communication signal that are frequency-shifted such that the payload channel is centered at $IF_P$; filtering the in-phase and quadrature component representations of the communication signal using the analog complex filter; generating a digital signal representing only one of the in-phase and quadrature components of the communication signal; and generating in-phase and quadrature component representations of the digital signal.

Further, in such embodiments, the processing the control channel may further include configuring a local oscillator to output a reference signal at a frequency of $(F_C-IF_C)$, wherein $F_C$ is an original center frequency of the control channel, wherein the frequency shifting includes mixing the communication signal with the reference signal. In such embodiments, the processing the payload channel may further include reconfiguring the local oscillator to output the reference signal at a frequency of $F_P-IF_P$, wherein $F_P$ is an original center frequency of the payload channel, wherein the frequency shifting includes mixing the communication signal with the reference signal.

Further, in such embodiments, the payload channel may be configured to begin at least a time T following the end of the control channel, wherein T is sufficient to allow said processing the control channel and said reconfiguring the local oscillator.

In any of the preceding embodiments, the processing the control channel may further include configuring the analog complex filter such that the control channel is not significantly attenuated, but a region centered at $-IF_C$ and having a bandwidth of $BW_C$ is significantly attenuated. In such embodiments, the processing the payload channel may further include reconfiguring the analog complex filter such that the payload channel is not significantly attenuated, but a region centered at $-IF_P$ and having a bandwidth of $BW_P$ is significantly attenuated.

Further, in such embodiments, the payload channel may be configured to begin at least a time T following the end of the control channel, wherein T is sufficient to allow said processing the control channel and said reconfiguring the analog complex filter.

Any of the preceding embodiments may be configured such that $BW_C>BW_P$.

In any of the preceding embodiments, the control channel may be a Physical Downlink Control Channel (PDCCH). Additionally, or alternatively, the payload channel may be a Physical Downlink Shared Channel (PDSCH).

Note that in the present description, various embodiments are described in the context of LTE. However, it is noted that the methods described herein can be generalized for other wireless technologies and are not limited to the specific descriptions provided above. For example, any discussion of the PDCCH may be generalized to control channels according to other wireless technologies, and any discussion of the PDSCH may be generalized to payload channels according to other wireless technologies.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Yet other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   one or more processors; and a memory storing instructions executable by the one or more processors, wherein the instructions, when executed, cause the apparatus to:
  generate in-phase and quadrature component representations of a received communication signal, wherein the received communication signal includes a frequency range of interest, wherein the generated in-phase and quadrature component representations are frequency-shifted relative to the communication signal such that the frequency-shifted frequency range of interest has a center frequency IF and does not include 0 Hz;
  filter the in-phase and quadrature component representations of the communication signal using an analog complex filter;
  generate a digital signal representing only one of the in-phase and quadrature components of the communication signal;
  generate in-phase and quadrature component representations of the digital signal; and
  decode the communication signal using the in-phase and quadrature component representations of the digital signal representing only one of the in-phase and quadrature components of the communication signal, wherein the other one of the in-phase and quadrature components of the communication signal is not used in decoding the communication signal.

2. The apparatus of claim 1, wherein the frequency range of interest has a bandwidth $BW_{RBs}$, wherein the analog complex filter is configured such that the frequency-shifted frequency range of interest is not significantly attenuated, but a region centered at −IF and having a bandwidth of $BW_{RBs}$ is significantly attenuated.

3. The apparatus of claim 1, further comprising:
  a local oscillator operatively coupled to the one or more processors for use in the frequency shifting;
  wherein the instructions, when executed, further cause the apparatus to:
    determine a bandwidth $BW_{RBs}$ of the frequency range of interest;
    determine a center frequency $F_{RBs}$ of the frequency range of interest;
    select IF such that $|IF|>BW_{RBs}/2$; and
    configure the local oscillator to operate at a frequency of $F_{RBs}-IF$.

4. The apparatus of claim 1, wherein the frequency range of interest has a bandwidth that is less than the bandwidth of a received communication channel through which the received communication signal is transmitted.

5. The apparatus of claim 1, wherein the frequency range of interest comprises a control channel.

6. The apparatus of claim 5, wherein the control channel is a Physical Downlink Control Channel (PDCCH).

7. The apparatus of claim 1, wherein the frequency range of interest comprises a payload channel.

8. The apparatus of claim 7, wherein the payload channel is a Physical Downlink Shared Channel (PDSCH).

9. The apparatus of claim 1, wherein generating the in-phase and quadrature component representations of the digital signal comprises further frequency-shifting the digital signal such that the further frequency-shifted frequency range of interest has a center frequency of 0 Hz, wherein the instructions, when executed, further cause the apparatus to filter the in-phase and quadrature component representations of the digital signal using a low-pass filter.

10. A method of processing a received communication signal including a frequency range of interest, the method comprising:
  generating in-phase and quadrature component representations of the communication signal that are frequency-shifted relative to the communication signal, wherein the frequency-shifted frequency range of interest has a center frequency IF and does not include 0 Hz;
  filtering the in-phase and quadrature component representations of the communication signal using an analog complex filter;
  generating a digital signal representing only one of the in-phase and quadrature components of the communication signal;
  generating in-phase and quadrature component representations of the digital signal; and
  decoding the communication signal using the in-phase and quadrature component representations of the digital signal representing only one of the in-phase and quadrature components of the communication signal, wherein the other one of the in-phase and quadrature components of the communication signal is not used in decoding the communication signal.

11. The method of claim 10, wherein the frequency range of interest has a bandwidth $BW_{RBs}$, wherein the analog complex filter is configured such that the frequency-shifted frequency range band of interest is not significantly attenuated, but a region centered at −IF and having a bandwidth of $BW_{RBs}$ is significantly attenuated.

12. The method of claim 10, wherein the frequency shifting utilizes a local oscillator, the method further comprising:
  determining a bandwidth $BW_{RBs}$ of the frequency range of interest;
  determining a center frequency $F_{RBs}$ of the frequency range of interest;
  selecting IF such that $|IF|>BW_{RBs}/2$; and
  configuring the local oscillator to operate at a frequency of $F_{RBs}-IF$.

13. The method of claim 10, wherein the frequency range of interest has a bandwidth that is less than the bandwidth of a received communication channel through which the received communication signal is transmitted.

14. The method of claim 10, wherein the frequency range of interest comprises a control channel.

15. The method of claim 14, wherein the control channel is a Physical Downlink Control Channel (PDCCH).

16. The method of claim 10, wherein the frequency range of interest comprises a payload channel.

17. The method of claim 16, wherein the payload channel is a Physical Downlink Shared Channel (PDSCH).

18. The method of claim 10, wherein generating the in-phase and quadrature component representations of the digital signal comprises further frequency-shifting the digital signal such that the frequency-shifted frequency range of interest has a center frequency of 0 Hz, the method further comprising filtering the in-phase and quadrature component representations of the digital signal using a low-pass filter.

19. A non-transitory computer-readable memory medium storing instructions executable by a wireless communications device to cause the wireless communications device to:
  generate in-phase and quadrature component representations of a received communication signal, wherein the received communication signal includes a frequency range of interest, wherein the generated in-phase and quadrature component representations are frequency-shifted relative to the communication signal such that the frequency-shifted frequency range of interest has a center frequency IF and does not include 0 Hz;

filter the in-phase and quadrature component representations of the communication signal using an analog complex filter;

generate a digital signal representing only one of the in-phase and quadrature components of the communication signal;

generate in-phase and quadrature component representations of the digital signal; and decode the communication signal using the in-phase and quadrature component representations of the digital signal representing only one of the in-phase and quadrature components of the communication signal, wherein the other one of the in-phase and quadrature components of the communication signal is not used in decoding the communication signal.

20. The non-transitory computer-readable memory medium of claim 19, wherein the instructions are further executable to cause the wireless communications device to:

determine a bandwidth $BW_{RBs}$ of the frequency range of interest;

determine a center frequency $F_{RBs}$ of the frequency range of interest;

select IF such that $|IF| > BW_{RBs}/2$; and configure a local oscillator to operate at a frequency of $F_{RBs} - IF$, wherein the frequency shifting utilizes the local oscillator.

* * * * *